United States Patent [19]

Nakahara et al.

[11] Patent Number: 5,507,518
[45] Date of Patent: Apr. 16, 1996

[54] TORSION BEAM TYPE SUSPENSION AND METHOD FOR PRODUCTION THEREOF

[75] Inventors: Keiji Nakahara, Chibaken; Kenji Saito; Kunihiko Hidaka, both of Kanagawa, all of Japan

[73] Assignee: Yorozu Corporation, Kanagawa, Japan

[21] Appl. No.: 372,809

[22] Filed: Dec. 24, 1994

[30] Foreign Application Priority Data

Dec. 24, 1993 [JP] Japan .................. 5-069375 U
Dec. 24, 1993 [JP] Japan .................... 5-328786

[51] Int. Cl.⁶ .................................. B60G 11/18
[52] U.S. Cl. ................ 280/723; 280/689; 267/273
[58] Field of Search ........................ 280/689, 723, 280/721; 267/273, 283, 154

[56] References Cited

U.S. PATENT DOCUMENTS

| | | | |
|---|---|---|---|
| 3,767,224 | 10/1973 | Schneeweiss | 280/273 |
| 4,486,030 | 12/1984 | Takata et al. | 280/689 |
| 5,439,243 | 8/1995 | Kato et al. | 280/689 |

OTHER PUBLICATIONS

JP-A-03-224,812 "Automobile Engineering" vol. 11 entitled Steering Suspension pp. 102, 103 pub. by Sankaido.

*Primary Examiner*—Kenneth R. Rice
*Attorney, Agent, or Firm*—Mathews, Woodbridge & Collins

[57] ABSTRACT

The torsion beam for a suspension is formed of a hollow shaft having a cross section substantially of the shape of an inverted letter U. It, therefore, can be manufactured simply and is enabled to enjoy light weight and improved torsional rigidity. This torsional rigidity can be adjusted and the amount of offset of the joined parts of opposite wheel supporting members from the other component parts can be freely adjusted. The end plates are constructed of a plurality of mutually joined end plates and the torsion beam is joined by welding to the surface for mounting the beam after the end plates have been machined. Thus, the torsion beam type suspension is manufactured with a relatively simple equipment, with the result that cost of equipment and the cost of production are lowered. The torsion beam can be manufactured with increased simplicity by subjecting a flat plate to the steps for swelling, folding and joining opposed of the flat plate or superposing a first and a second plate severally formed in a structure having a cross section substantially of the shape of an inverted letter U.

9 Claims, 7 Drawing Sheets

FIG. 4A
FIG. 4B
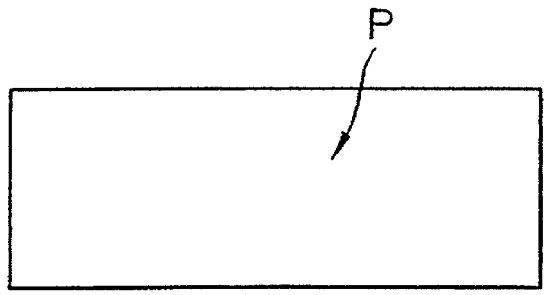
FIG. 5A
FIG. 5B
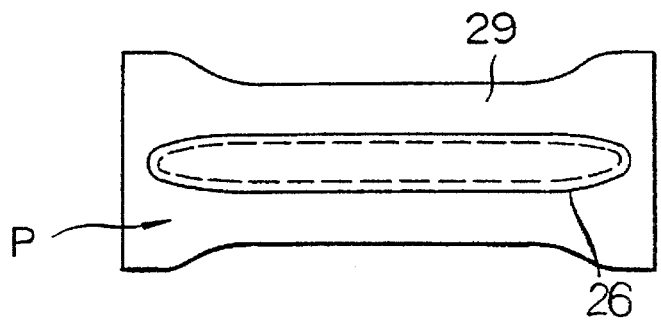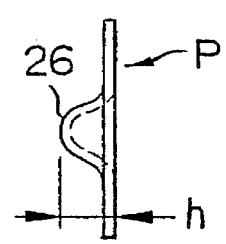
FIG. 6A
FIG. 6B
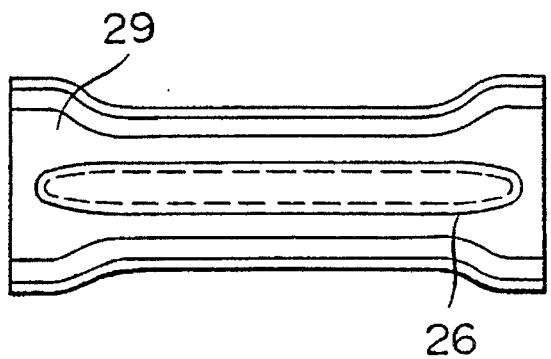
FIG. 7A
FIG. 7B
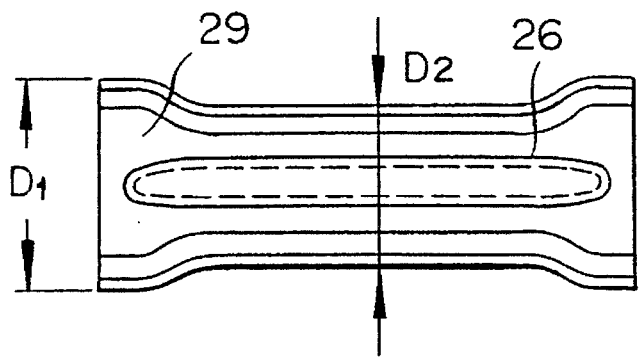

FIG. 8A
FIG. 8B
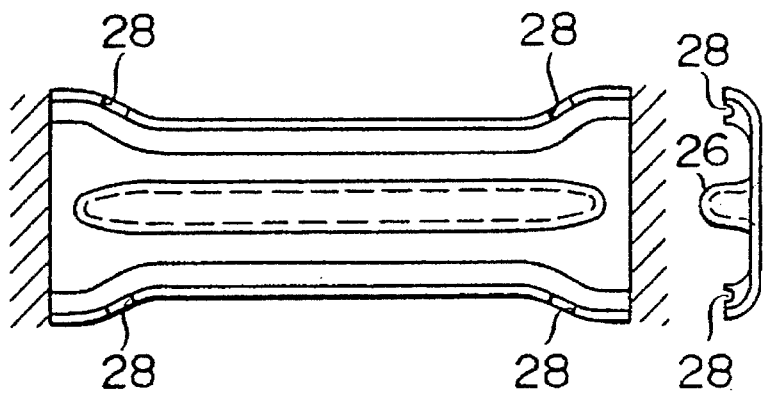
FIG. 9A
FIG. 9B
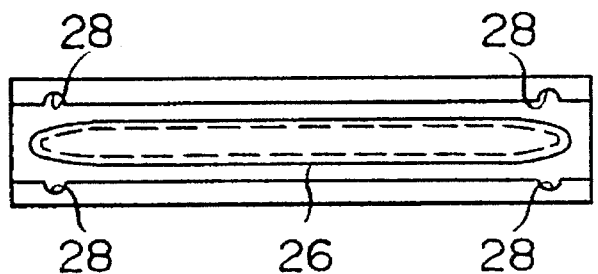
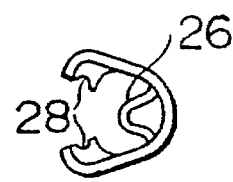
FIG. 10A
FIG. 10B
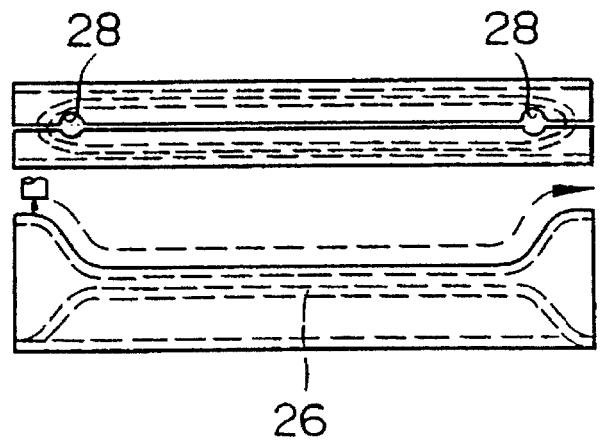
FIG. 10C

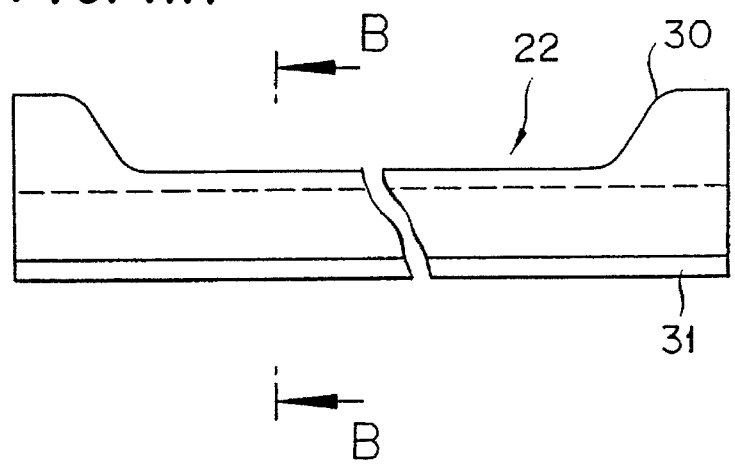
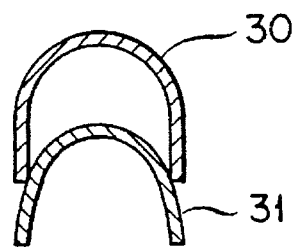
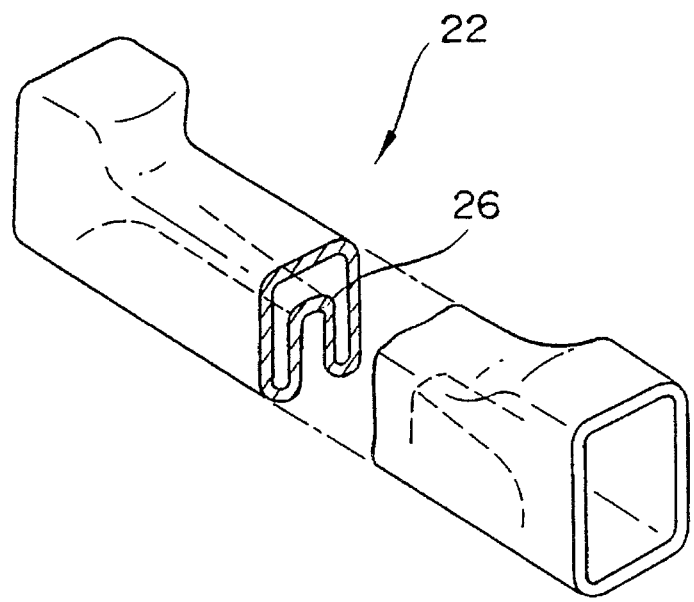

5,507,518

TORSION BEAM TYPE SUSPENSION AND METHOD FOR PRODUCTION THEREOF

BACKGROUND OF THE INVENTION

1. Field of the Invention

This invention relates to a combination axle-torsion beam type suspension for use such as in the rear suspension of an automobile and a method for the production thereof.

2. Description of the Prior Art

The recent automobiles have been urging satisfaction of increasingly rigid demands for lightening weight and simplifying structure of the vehicle and for lowering cost of the manufacture by such reasons as the intensifying competition in price and the exacting necessity for preserving resources and saving energy. The suspensions in the automobiles are not exempted from this trend.

To fulfill these demands, the recent automobiles have come to adopt a combination axle-torsion beam type suspension which is adapted to interconnect the axles of laterally opposite wheels with one beam (as disclosed in JP-A-03-224,812 and shown in the "Automobile Engineering," Volume 11 titled "Steering Suspension," pp. 102 and 103, published by Sankaido, for example).

The torsion beam type suspension which is used in the rear suspension has wheel supporting members attached one each to the opposite ends of a torsion beam having a cross section of the shape of an inverted letter U and trailing arms rigidly joined as by welding to the opposite end parts and assigns the intermediate part between the trailing arms as a member destined to be twisted.

This torsion beam is vested with a structure capable of lowering exclusively the torsional rigidity of the torsion beam without lowering the bending rigidity thereof, namely a cross-sectional structure having the lower end side of the shape of an inverted letter U left open (hereinafter referred to as "open inverted U cross-sectional structure"), for the purpose of facilitating the motion of the automobile body in the vertical direction while the positioning of the automobile body in the lateral and the longitudinal direction is in progress. At times, it may be furnished with a stabilizer for the purpose of enervating the rolling which is generated by the centrifugal force while the automobile is in the process of making a curve in travel.

In this suspension, the trailing arms and the torsion beam immediately move vertically and generate no torsion when the laterally opposite wheels produce strokes of an equal amount in the same direction relative to the automobile body. When the automobile body is tilted under the centrifugal force exerted thereon and the laterally opposite wheels consequently execute strokes in the reverse direction relative to the automobile body as when the automobile makes a turn, for example, the torsion beam is induced to generate torsion. This torsion is positively utilized for the function of the suspension.

When the laterally opposite wheels execute a stroke in the reverse direction as described above, the torsion beam is twisted and induced to generate a torsional reaction proportionate to the torsional rigidity of the torsion beam and the automobile body is consequently tilted until the resultant force between this torsional reaction and the laterally opposite spring reactions equals the force tending to tilt the automobile body.

The adjustment of this tilt of the automobile body, namely the so-called stabilizer effect, therefore, can be attained by adjusting the torsional rigidity of the torsion beam. The torsion beam type suspension, therefore, may well be regarded as a suspension which has a stabilizer integrated with an axle serving the purpose of positioning the laterally opposite wheels.

Incidentally, the stabilizer effect has the optimum strength of its own, depending on the characterizing features of the relevant automobile. For the purpose of adjusting this stabilizer effect, it is desirable to alter suitably the torsional rigidity of the torsion beam depending to the kind of automobile.

When the torsion beam which is formed of a beam having a cross section of the shape of an inverted letter U as described above is used, it is not easy to alter or adjust the torsional rigidity without noticeably varying the cross-sectional size of the torsion beam. Because of the restriction imposed on the peripheral space, it is difficult to manufacture the torsion beam in a structure capable of offering the optimum rigidity.

For the purpose of enabling the torsion beam to attain required adjustment of the torsional rigidity, therefore, the torsion beam is provided additionally with a rodlike or a tubular stabilizer. Thus, this torsion beam is at a disadvantage in increasing the number of component parts and the weight of its own.

Since the suspension of this kind must be completed so that the spindle thereof may acquire prescribed toe-in angle (0.5 degree, for example) and camber angle (1 degree, for example) and the surface for mounting the brake may possess prescribed accuracy of runout, the parallelism between the spindle and the surface for mounting the spindle or the surface for mounting the brake, the difference in height between these two surfaces, and the tilt of the axle demand unusually exacting accuracy. For this reason, the hole for forced insertion of the spindle and the surface for mounting the brake are processed by machining after the end plate has been joined to the torsion beam by welding and before the spindle is finally inserted into the end plate under pressure.

When the end plate is processed by machining, therefore, the torsion beam of a usually great length must be wholly set in place preparatorily on a machine. Thus, the equipment for machining inevitably becomes voluminous and the cost of equipment and the cost of production are proportionately high.

SUMMARY OF THE INVENTION

The object of this invention resides in providing a torsion beam type suspension having the beam thereof so constructed as to permit generous variation in torsional rigidity enough to facilitate adjustment of the torsional rigidity and enable the torsion beam type suspension to reduce its weight and decrease the number of its component parts, a method for the production of a torsion beam type suspension by the use of a relatively simple equipment and consequently at a low cost of equipment and a low cost of production, and a method for the production of a torsion beam by a simple procedure.

To accomplish the object mentioned above, the first aspect of this invention consists in a torsion beam type suspension which comprises a torsion beam having attached to the opposite end parts thereof wheel supporting members rotatably supporting laterally opposed wheels and adapted to be twisted by the strokes of the laterally opposite wheel supporting members in the reverse direction and characterized in that the torsion beam is formed with a hollow shaft of a cross section of the shape of an inverted letter U having a swelled part formed throughout the entire length thereof as dilated inward in the radial direction from the lower surface side thereof.

To accomplish the object mentioned above, the second aspect of this invention consists in a torsion beam type suspension which comprises a torsion beam having attached to the opposite end parts thereof wheel supporting members rotatably supporting laterally opposed wheels and adapted to be twisted by the strokes of the laterally opposite wheel supporting members in the reverse direction and characterized in that the torsion beam is formed with a hollow shaft of a cross section of the shape of an inverted letter U having a swelled part formed throughout or substantially throughout the entire length thereof as dilated inward in the radial direction from the lower surface side thereof and the cross section of the hollow part perpendicular to the axis thereof is larger in the parts of the torsion beam connected to the laterally opposite wheel supporting members than in the middle part of the torsion beam in the axial direction thereof.

The torsion beam in the second aspect of this invention is characterized in that the upper surfaces of the parts connected to the laterally opposite wheel supporting members are set above the upper surfaces of the middle part between the opposite trailing arms.

The torsion beam in the second aspect of this invention is characterized by being provided in the upper portion of the swelled thereof with at least one opening part.

To accomplish the object mentioned above, the third aspect of this invention consists in a method for the production of a torsion beam having attached to the opposite end parts thereof wheel supporting members rotatably supporting laterally opposite wheels, which method comprises a swelled part forming step for expanding the central part of a flat plate substantially throughout the entire length thereof in the longitudinal direction, a folding step for bending the laterally opposite end parts of the flat plate centering about the swelled in the direction of the dilation and subsequently folding the laterally opposite end parts until they substantially contact each other, and a joining step for joining the laterally opposite end parts to each other.

To accomplish the object mentioned above, the fourth aspect of this invention consists in a method for the production of a torsion beam type suspension having attached to the opposite end parts thereof wheel supporting members rotatably supporting laterally opposite wheels, which method is characterized in that the torsion beam is comprised of a first and a second plate such as to form a cross section substantially of the shape of an inverted letter U perpendicular to the axis thereof and allowed to enclose a hollow part therewith by inserting the rear part of one of the two plates from the open side of the other plate inward thereby overlapping the two plates and joining the lower end of one of the plates to the butting part of the other plate by means of welding.

To accomplish the object mentioned above, the fifth aspect of this invention consists in a torsion beam type suspension having spindles so fixed to end plates joined by welding to the axially opposite end parts of the torsion beam as to give rise to prescribed toe-in angle and camber angle and having wheel supporting members for rotatably supporting wheels attached to the spindles, which torsion beam type suspension is characterized in that the end plates are formed of a plurality of end plates mutually joined by welding in an overlapping state and machined so that the surfaces for mounting the beam, the surfaces for mounting the spindles, and the surface for mounting the brake assume prescribed degrees of accuracy and the surfaces for mounting the beam and the torsion beam are joined by welding.

The end plates in the fifth aspect of this invention comprise a first and a second end plate and are characterized in that the first end plate has bored therein a spindle through hole for permitting insertion therethrough of the spindle, the second end plate has bored therein a through hole larger in diameter than the spindle through hole, and the first and the second end plates are joined by welding in the edge part of the spindle through hole.

The first end plate in the fifth aspect of this invention is characterized by being provided in the inner wall part of the spindle through hole with a boss for engagement with the through hole in the second end plate.

The invention will be better understood and the objects, characteristics, and features thereof other than those set forth above will become apparent when consideration is given to the following detailed description thereof, which makes reference to the annexed drawings.

BRIEF DESCRIPTION OF THE DRAWINGS

FIG. 4 illustrates a plate member to be used in the methods for the production of a torsion beam according to the second and the third aspect of this invention; the part (A) depicting a plan view and the part (B) a side view.

FIG. 5 illustrates the plate member in the process of being swelled; the part (A) depicting a plan view and the part (B) a side view.

FIG. 6 illustrates the plate member in the process of first bending; the part (A) depicting a plan view and the part (B) a side view.

FIG. 7 illustrates the plate member in the process of trimming; the part (A) depicting a plan view and the part (B) a side view.

FIG. 8 illustrates the plate member in the process of cam notching; the part (A) depicting a plan view and the part (B) a side view.

FIG. 9 illustrates the plate member in the process of folding; the part (A) depicting a plan view and the part (B) a side view.

FIG. 10 illustrates the plate member in the process of joining; the part (A) depicting a plan view, the part (B) a side view, and the part (C) a front view.

FIG. 11 illustrates the structure of a torsion beam according to the fourth aspect of this invention; the part (A) depicting a front view, the part (B) a cross section taken through FIG. 11 (A) along the line B—B.

FIG. 12 is a partially cutaway perspective view of another embodiment of the torsion beam according to the first aspect of this invention.

DETAILED DESCRIPTION OF PREFERRED EMBODIMENTS

Figure 1:
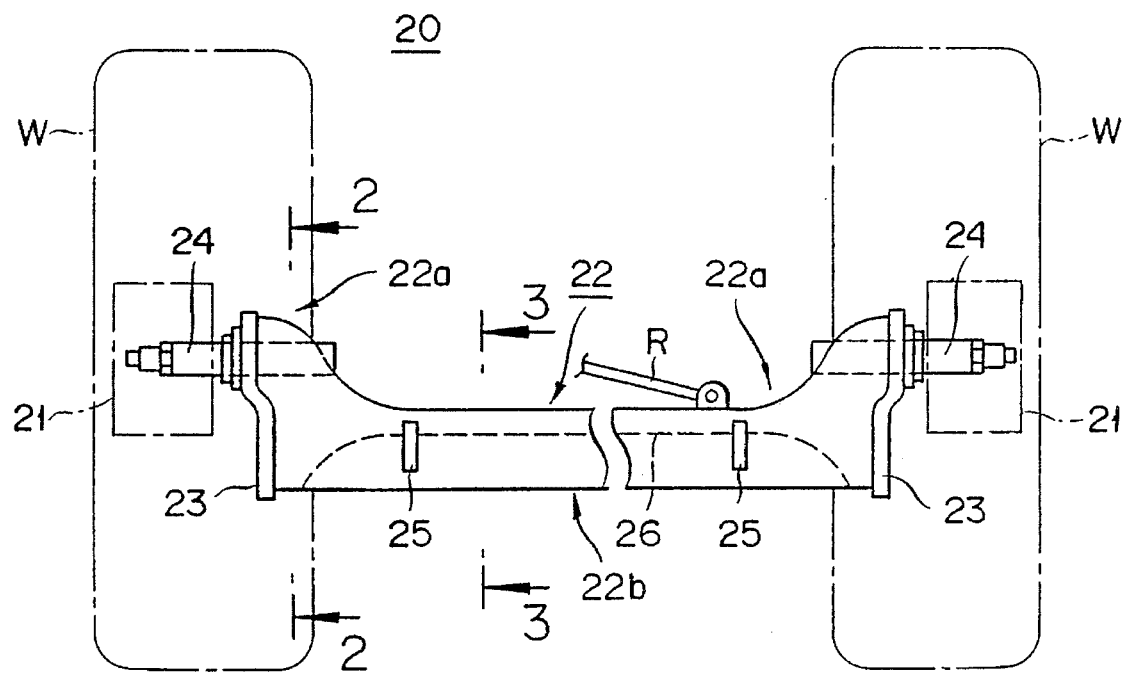
FIG. 1 is a schematic front view of a suspension part with a torsion beam in accordance with one embodiment of the first aspect of this invention.

A suspension 20 shown in FIG. 1 is a rear suspension for use in a FF car and is provided with wheel supporting members 21, 21 severally for rotatably supporting laterally opposite wheels W and a torsion beam 22 having the wheel supporting members 21, 21 attached to the opposite ends thereof.

The torsion beam 22 has end plates 23, 23 fixed each to the opposite ends thereof as by welding and spindles 24, 24 thrust through and fixed to the end plates 23, 23. The rear ends of the spindles 24, 24 are thrust through the torsion beam 22 and attached fast thereto. To these spindles 24, 24 are attached the wheel supporting members 21, 21 mentioned above.

Trailing arms 25, 25 are rigidly joined as by welding to the inner sides of the parts of the torsion beam 22 which are connected to the laterally opposite wheel supporting members 21, 21. A lateral rod R and other parts are also attached to the torsion beam 22. Since various component parts for an automobile are disposed above the torsion beam 22, this torsion beam 22 is so disposed that the upper surface of the middle part 22b of the torsion beam 22 between the two trailing arms 25, 25 may be below the upper surface of the connecting parts 22a of the torsion beam 22 to the laterally opposite wheel supporting members 21, 21.

Figure 2:
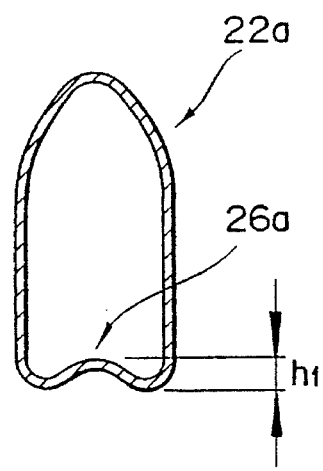
FIG. 2 is a cross section taken through FIG. 1 along the line 2—2.
Figure 3:
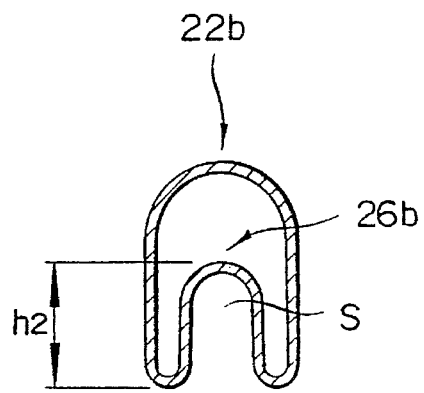
FIG. 3 is a cross section taken through FIG. 1 along the line 3—3.

Particularly, the torsion beam 22 of the present embodiment is formed of a hollow shaft. This hollow shaft has such a structure as illustrated in FIG. 2 and FIG. 3, namely a cross section substantially of the shape of an inverted letter U perpendicular to the axis having a swelled part 26 (referring collectively to 26a and 26b which will be mentioned afterward) formed throughout the entire length thereof in the axial direction as dilated inward in the radial direction from the lower surface side thereof. In the swelled part 26, the vertical height h1 of the swelled 26a (FIG. 2) of the connecting part 22a to which the laterally opposite wheel supporting members 21, 21 are attached is smaller than the vertical height h1 of the swelled 26b (FIG. 3) of the middle part 22b. At times, the vertical height h1 of the swelled part 26a may equal the vertical height h1 of the swelled part 26b, depending on the optimum strength of the torsional rigidity. In short, this torsion beam 22 is formed of a hollow shaft of a cross section substantially of the shape of an inverted letter U having a swelled part formed throughout the entire length thereof in the axial direction as dilated inward in the radial direction from the lower surface side.

When the height h1 of the swelled part 26a at the connecting part 22a is smaller than the vertical height h1 of the swelled part 26b in the middle part 22b as described above, the second moment of area of the connecting part 22a surpasses that of the middle part 22b and the torsional rigidity gains in strength and the torsion beam 22 is liable to be twisted in the middle part 22b thereof between the trailing arms 25, 25.

The torsional rigidity is proportional to the second moment of area and increases in proportion as the second moment of area increases because it is expressed by the product of the shear modulus multiplied by the section polar secondary moment. Where the shape, namely the dimension of the external shape and the plate thickness, is fixed, therefore, the cross section can be varied and the second moment of area can be increased or decreased merely by adjusting the heights of the swelled parts 26a, 26b mentioned above. Thus, the torsional rigidity can be readily altered and adjusted to a notable extent.

As a result, this torsion beam 22 is allowed to have the rigidity thereof adjusted relative to the torsional force by suitably adjusting the vertical height h2 of the swelled part 26b in the middle part 22b. The torsional rigidity, therefore, can be set to suit a varying type of automobile. By giving a larger cross section to the connecting parts with the laterally opposite wheel supporting members than to the middle part 22b, for example, the torsional rigidity of the middle part 22b destined to generate torsion can be lowered and the torsional rigidity and the flexural rigidity in the parts outside the trailing arms can be heightened.

For the purpose of lowering the torsional rigidity, it is only necessary to increase the height h2 of the swelled 16b to the fullest possible extent and decrease the cross section of the middle part 22b to the fullest possible extent and decrease the plate thickness as well. The torsional rigidity may be further lowered by forming at least one opening part (not shown) on or near the upper side of the swelled part 26b and giving this opening part an open cross section. In this case, the range of adjustment of the torsional rigidity can be widened by adjusting suitably the length of this opening part in the axial direction.

The torsion beam 22 which is formed of the hollow shaft of a cross section substantially of the shape of an inverted letter U is allowed to have the rigidity thereof easily adjusted in a wide range relative to the torsional force. Thus, it obviates the necessity for a stabilizer. The omission of the stabilizer results in simplifying the structure of the suspension, reducing the weight thereof, decreasing the number of component parts thereof, and cutting the cost of production thereof.

One example of the method for the production of this torsion beam 22 will be described below.

This torsion beam 22 can be relatively easily formed by subjecting a flat plate P having a longer side and a shorter side to pressure forming in accordance with the procedure shown in FIGS. 4 through 10.

Step for forming swelled part

First, the central part relative to the shorter side of the flat plate P having a longer side and a shorter side as shown in FIG. 4A and FIG. 4B is draw formed along the longitudinal direction as shown in FIG. 5A and FIG. 5B to form the swelled part 26. The length of this swelled 26 in the longitudinal direction substantially equals the longer side of the flat plate P. When the torsion beam 22 is not given prescribed torsional rigidity by one round of the draw forming, the draw forming is repeated several rounds until the swelled part 26 acquires a height capable of manifesting the prescribed torsional rigidity and enabling the vertical heights h1, h2 of the swelled parts 26a, 26b to be suitably adjusted.

Step for folding

Then, the laterally opposite end parts of the flat plate P centering about the swelled parts 26a, 26b are folded in the direction of the swelling as shown in FIG. 6A and FIG. 6B.

For the purpose of enabling the flat plate P to be relatively smoothly folded in the process of folding, the folding is desired to be carried out as divided into a plurality of stages. In this case, for the purpose of forming the torsion beam 22 so that the upper surface of the connecting parts 22a may fall below the upper surface of the middle part 22b, it is necessary to trim the laterally opposite end parts of the flat plate P and cause the flat plate P centering about the swelled part 26 to acquire a width such that the width D1 of the axially opposite end parts of the swelled part 26 may surpass the width D2 of the central part (see FIG. 7A and FIG. 7B). This trimming work may be performed prior to the step of drawing mentioned above.

Further, during the trimming work, the flat plate P may be subjected to cam notching or cam restriking for the purpose of forming through holes or notches at stated portions in the flat plate P or partially deforming the flat plate P. The through holes shown in FIG. 8A and FIG. 8B are semicircular holes 28, which are intended for permitting insertion therethrough of the rear ends of the spindles 24, 24.

Subsequently, the laterally opposite end parts of the flat plate P are folded until they abut each other as shown in FIG. 9A and FIG. 9B. Step of welding The flat plate P which has been folded as described above is nipped by a suitable nipping device with the laterally opposite end parts thereof kept in the abutted state and the abutted end faces of the plate are joined to each other as by arc welded as shown in FIG. 10A, FIG. 10B, and FIG. 10C. Thus, the production of the torsion beam is completed.

From the flat plate so adopted as the work blank for the production of the torsion beam 22, the torsion beam 22 aimed at can be produced by such rather simple operations as expanding, folding and welding. Thus, the torsion beam 22 can be manufactured inexpensively and quickly. The manufacture can be further facilitated and the product obtained with a further enhanced dimensional accuracy when the process of folding is performed as divided into primary folding, trimming of the laterally opposite end parts of the flat plate P, and secondary folding. The amount of the aforementioned offset of the two vertical heights can be easily set by adjusting the shape to be obtained by trimming.

The production of the torsion beam 22 may be otherwise attained by the following method.

This method consists in forming the torsion beam 22 by superposing a first and a second plate 30, 31 having cross sections substantially of the shape of an inverted letter U as shown in FIG. 11A and FIG. 11B.

To be specific, the first and the second plate 30, 1 having cross sections substantially of the shape of an inverted letter U are preparatorily formed. These two plates 30, 31 are superposed by causing the rear part of the second plate 31 to be inserted from the open side of the first plate 30 inward. In this case, the two plates 30, 31 are desired to be formed in consideration of the amount of the offset mentioned above and the strength of torsional rigidity. Then, the lower ends of the first plate 30 and the butting portions of the rear part of the second plate 31 are joined as by arc welding.

By this method, the torsion beam 22 can be produced more simply than the method described above. Further, the torsion beam thus formed is at an advantage in allowing the torsional rigidity thereof to be adjusted with enhanced simplicity because it has a structure such that the hollow cross section may be formed by joining the first plate 30 and the second plate 31.

According to the first aspect of this invention, since the torsion beam is formed of a hollow shaft of a cross section substantially of the shape of an inverted letter U having a swelled part formed throughout the entire length in the axial direction, it acquires prescribed torsional rigidity with a smaller cross section than the conventional torsion beam and enjoys a reduction of the weight of its own.

Further when the vertical height of the inner swelled is adjusted, an opening part is formed in the swelled, and the cross section of the middle part and the cross section of the connecting parts with the laterally opposite wheel supporting members are varied as contemplated by the second aspect of this invention, these measures enable the torsional rigidity of the torsion beam to be altered and adjusted and this adjustment of the torsional rigidity, during the attachment of the torsion beam to an automobile body, gives rise to the stabilizer effect which permits the tilt of the automobile body to be adjusted. By suitably selecting these measures, the range of adjustment of the torsional rigidity is widened and the adjustment of torsional rigidity is further simplified.

When the torsion beam so constructed that the upper surface of the middle part between the trailing arms may fall below the upper surface of the connecting parts mentioned above is attached to an automobile body, an empty space is created in the area above the central part of the torsion beam and is advantageously utilized for facilitating the layout of various automobile parts in the neighborhood of the suspension.

Moreover, since the torsion beam formed of a hollow shaft of a cross section substantially of the shape of an inverted letter U allows the torsional rigidity thereof to be adjusted in a wide range, it obviates the necessity for a stabilizer and contributes to simplify the structure of the suspension and decrease the weight thereof.

According to the third aspect of this invention, since the torsion beam is formed by subjecting a flat plate to the swelling step, the folding step and the welding step, the manufacture of the torsion beam is attained with simplicity.

According to the fourth aspect of this invention, the manufacture of the torsion beam is accomplished with further simplicity because this torsion beam is formed by superposing a first and a second plate severally having a cross section substantially of the shape of an inverted letter U, joining the two plates as by welding, and causing a resultantly interposed empty space to acquire a prescribed shape.

Then, the construction of a suspension by the use of the torsion beam which is formed as described above is desired to be implemented as follows.

Figure 14:
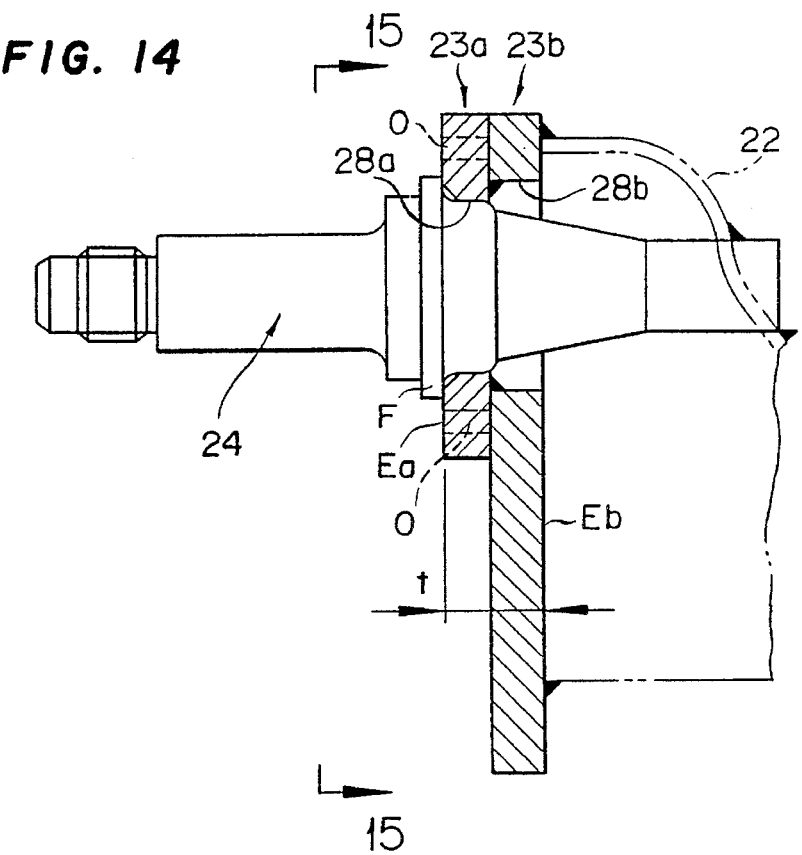
FIG. 14 is a cross section illustrating the essential part of a torsion beam type suspension according to the fifth aspect of this invention.

First, the first plate 23a having preparatorily formed therein the spindle through hole 28a for permitting insertion therethrough of the spindle 24 and the second end plate 23b having preparatorily formed therein the through hole 28b having a larger diameter than the spindle through hole 28a are pressed against each other with the axes of the through holes 28a, 28b substantially coinciding with each other as shown in FIG. 14 and then joined fast to each other by welding the entire inner wall part of the spindle through hole 28a. This welding of the inner wall part is desired to be carried out by arc welding, resistance welding, or electron beam welding, for example. When the two end plates 23a, 23b are welded at the sites close to the spindle through hole 28a as described above, the end plates themselves are not easily deformed when the welding beads are contracted by spontaneous cooling after the work of welding. Thus, the end plates as a whole are enabled to keep their dimensional accuracy intact.

Figure 15:
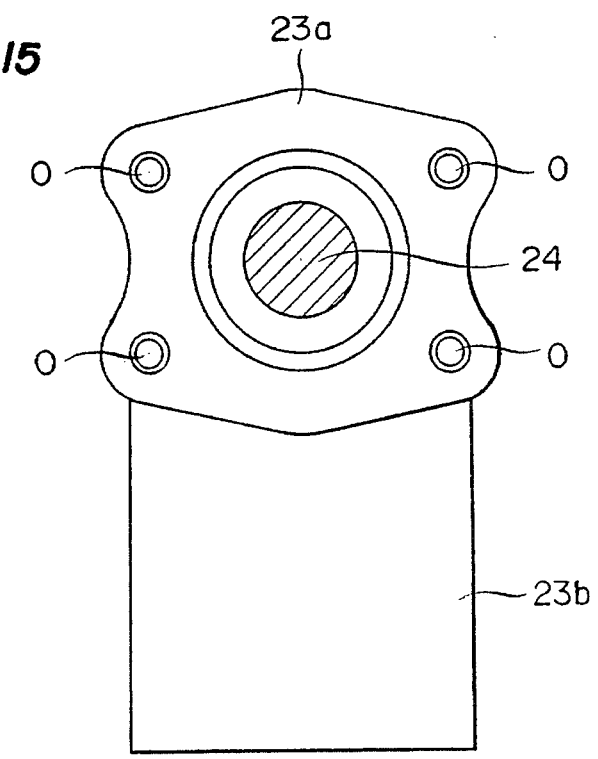
FIG. 15 is an end face diagram taken through FIG. 14 along the line 15—15.

Then, the spindle side end face Ea of the first end plate 23a and the torsion beam side end face Eb of the second end plate 23b are severally smoothed by machining until the width t between the two end plates 23a, 23b reaches a prescribed size, the parallelism between the spindle 24 and the surface for mounting the spindle 24 or the surface for mounting the brake reaches a prescribed degree, and the difference in height between the two surfaces and the accuracy of the tilt of the shaft falls in respectively prescribed ranges. Further, holes 0 (see FIG. 15) for the attachment of the brake are formed by machining on the basis of the spindle side end face Ea of the first end plate 23a.

Then, the torsion beam 22 is joined by welding to the torsion beam side end face Eb of the second end plate 23b. During this welding, the torsion beam 22 and the second end plate 23b are set fast in place with the aid of jigs to ensure the impartation of the prescribed toe-in angle and camber angle. In this case, since the joining of the second end plate 23b and the torsion beam 22 by welding is carried out after the aforesaid machine work, the welding strain which is generated during the welding is hardly extended to the first end plate 23. If the strain reaches the first end plate 23 at all, the degree of the strain lodged therein is nominal. Thus, the torsion beam and the first end plate 23 thus joined are allowed to secure expected dimensional accuracy to a full extent.

Finally, the spindle 24 is forced into the spindle through hole 28a of the first end plate 23a until the flange part F of the spindle 24 butts against the end face Ea of the first end plate 23a to form an integral structure consisting of the two end plates 23a, 23b and the spindle 24. The joining of the torsion beam 22 and the second end plate 23b by welding may be carried out, when necessary, after the spindle 24 has been fit into the first end plate 23a.

After the torsion beam part has been formed as described above, the suspension is completed by attaching the trailing arms 25, 25, the lateral rod R, etc. to the torsion beam 22 as by welding and, at the same time, attaching the laterally opposite wheel supporting members 21, 21 to the spindle 24.

In the manufacture of the suspension which is executed as described above, since the two component members of the end plate 23 are preparatorily joined by welding and the product of this welding and the torsion beam 22 are joined by welding, the strain to be generated when the second end plate 23b and the torsion beam 22 are welded hardly reaches the first end plate 23a to which the spindle 24 is attached. If the strain reaches the first end plate 23a at all, the degree of the strain lodged therein is nominal. Thus, the final product is allowed to secure required dimensional accuracy to a full extent.

Unlike the conventional practice of machining large parts after the spindle part has been attached to the torsion beam, the machine work involved in the present aspect of this invention is limited to such a relatively simple work as boring necessary through holes and a hole for the attachment of the brake in the end faces of the two end plates kept in a superposed state. Thus, the manufacture does not need to use a complicated voluminous equipment or entail an intricate operation and instead enjoys enhanced productivity and lowered cost.

It is to be distinctly understood that the invention is not limited the embodiments cited hereinabove but may be otherwise variously embodied and practiced within the scope of the claims.

Figure 13A:
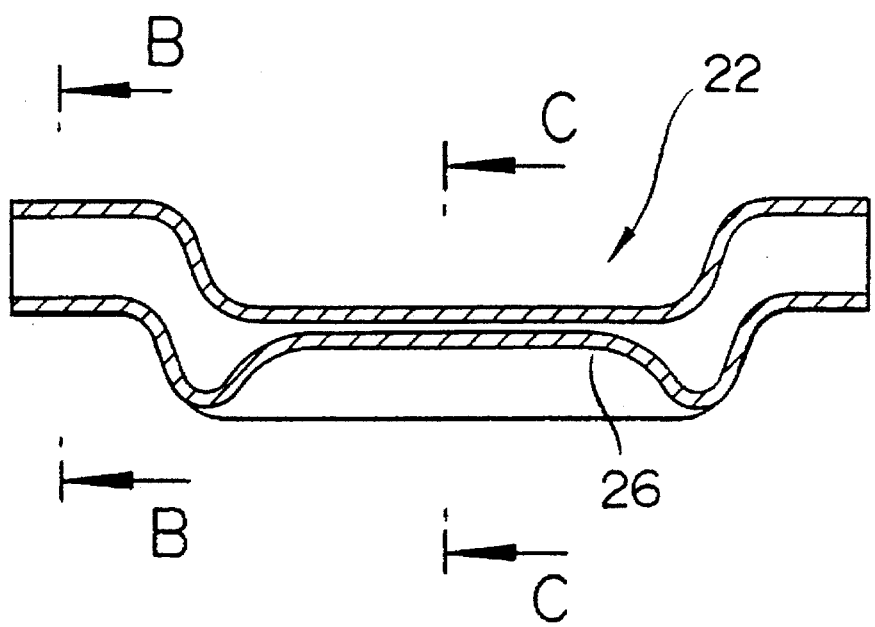
FIG. 13 illustrates still another embodiment of the torsion beam according to the first aspect of this invention; the part (A) depicting a front cross section and the parts (B) and (C) depicting cross sections taken through FIG. 13 (A) respectively along the lines B—B and C—C.
Figure 13B:
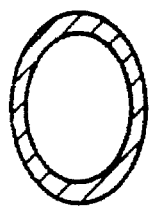
Figure 13C:
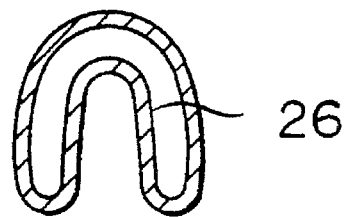

For example, the torsion beam 22 described above has been depicted as having a cross section substantially of the shape of a semicircle as shown in FIG. 2 and FIG. 3. Instead of this shape, it may have a cross section substantially of the shape of a rectangle as shown in FIG. 12. Alternatively, it may be in such a structure that the opposite ends are in a cylindrical shape and the intermediate part is in the shape of an swelled part 26b as shown in FIG. 13A, FIG. 13B, and FIG. 13C.

The torsion beam 22 described above has the middle part thereof offset downward because automobile parts are disposed above the torsion beam 22. It may be in a straight shape containing no offset part. Otherwise, it may have the middle part thereof offset upward.

The method for the production of the torsion beam is only required to comprise a step for swelling a flat plate, a step for folding the flat plate, and a step for joining the opposed end faces of the flat plate. This folding step is not always required to embrace primary folding, trimming, secondary folding, or such works as cam notching and cam restriking.

Quite naturally, the torsion beam type suspension described above may be provided in the hollow shaft of a cross section of the shape of an inverted letter U or in the empty space S of the shape of an inverted letter U with a stabilizer bar. The present embodiment of the torsion beam type suspension is depicted to use the two end plates, i.e. the first end plate 23a and the second end plate 23b. Instead, it may use more end plates. Further, the surface of the first end plate 23a for mounting the spindle is not always required to be flush with the surface thereof for mounting the brake.

Figure 16:
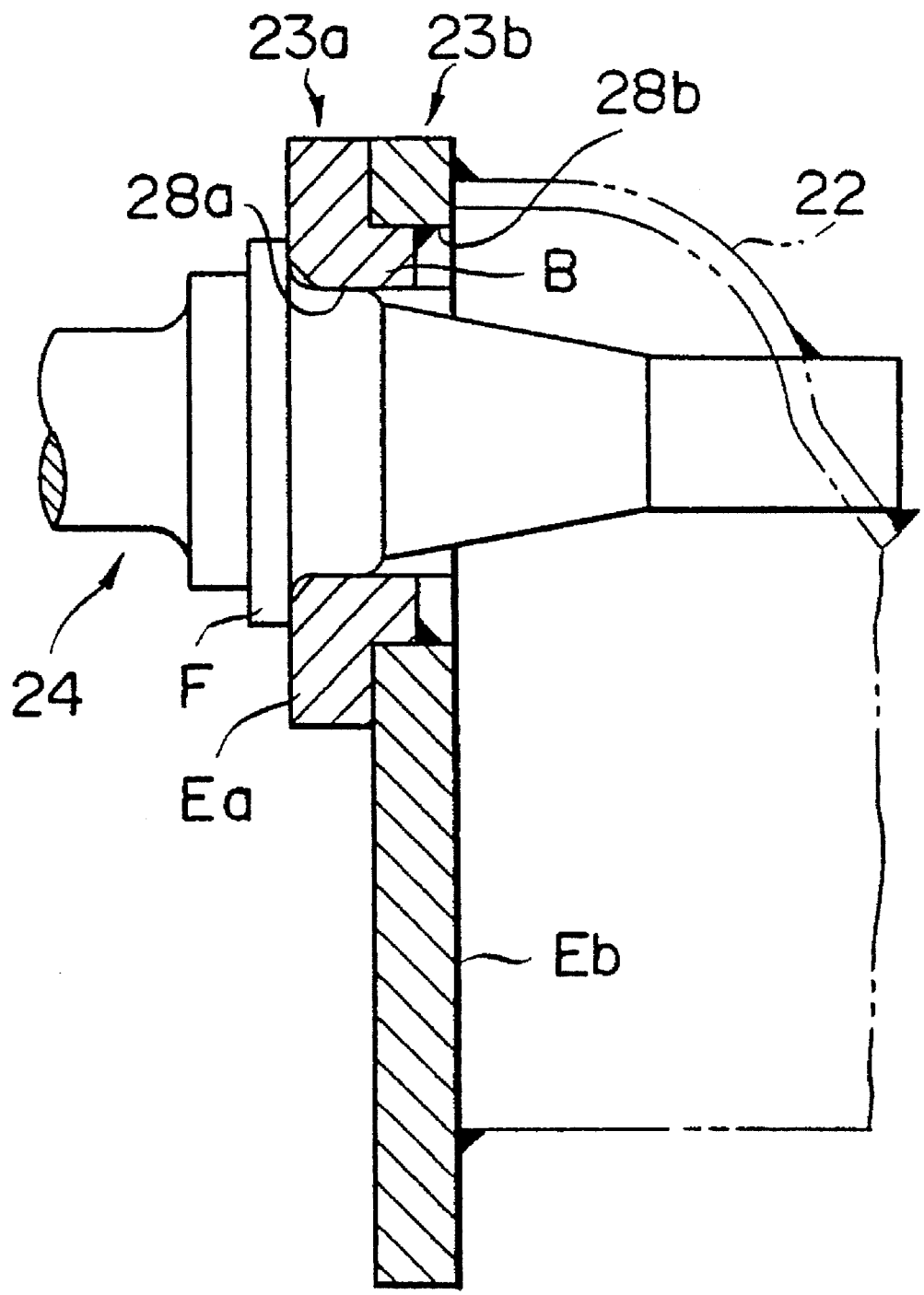
FIG. 16 is a cross section corresponding to that of FIG. 14 in illustrating another embodiment of the torsion beam type suspension according to the fifth aspect of this invention.

The present embodiment of the torsion beam type suspension is depicted to be in such a structure that the two end plates are joined to each other with the axes of their respective through holes 28a, 28b substantially coinciding with each other. Instead of this structure, the torsion beam type suspension may be in such a structure that the first end plate 23a is provided on the inner wall part of the spindle through hole with a boss part B which is adapted to fit into the through hole 28b in the second end plate 23b as shown in FIG. 16. This structure facilitates the alignment of the axes of the through holes, simplifies the work of joining the two end plates, and improves the efficiency of this work. The inside diameter of the boss part B is suitably decided based on the external shape of the spindle 24.

The boss part B mentioned above, when necessary, may be further extended until the leading end thereof falls flush with or protrudes from the end face Eb of the second end plate 23b. Since the leading end of the boss part B clearly indicates the site of welding, it brings about the merit of further facilitating the work of welding.

The end plates described above are invariably depicted as the ones adapted for the drum brake. It goes without saying that they may be applied for the disk brake. Though the end plates for the disk brake are omitted from illustration herein, they may be such that the upper end part of the first end plate 23a shown in FIG. 14 is more or less extended upward and bent inward, namely toward the torsion beam side.

We claim:

1. A torsion beam type suspension comprising a torsion beam having attached to the opposite end parts thereof wheel supporting members rotatably supporting laterally opposed wheels and adapted to be twisted by the strokes of said laterally opposite wheel supporting members in the reverse direction, wherein said torsion beam is formed with a hollow shaft of a cross section of the shape of an inverted letter U having a swelled part formed throughout the entire length thereof as dilated inward in the radial direction from the lower surface side thereof.

2. A torsion beam type suspension comprising a torsion beam having attached to the opposite end parts thereof wheel supporting members rotatably supporting laterally opposed wheels and adapted to be twisted by the strokes of said laterally opposite wheel supporting members in the reverse direction, wherein said torsion beam is formed with a hollow shaft of a cross section of the shape of an inverted letter U having a swelled part formed throughout or substantially throughout the entire length thereof as dilated inward in the radial direction from the lower surface side thereof and the cross section of the hollow part perpendicular to the axis thereof is larger in the parts of said torsion beam connected to said laterally opposite wheel supporting members than in the middle part of said torsion beam in the axial direction thereof.

3. The torsion beam type suspension according to claim 2, wherein the upper surfaces of the parts connected to said laterally opposite wheel supporting members are set above the upper surfaces of the middle part between the opposite trailing arms.

4. The torsion beam type suspension according to any of claims 1 through 3, wherein said torsion beam is provided in the upper portion of said swelled part thereof with at least one opening part.

5. A method for the production of a torsion beam having attached to the opposite end parts thereof wheel supporting members rotatably supporting laterally opposite wheels, which method comprises a swelled part forming step for expanding the central part of a flat plate substantially throughout the entire length thereof in the longitudinal direction, a folding step for bending said laterally opposite end parts of said flat plate centering about said swelled in the direction of the dilation and subsequently folding said laterally opposite end parts until they substantially contact each other, and a joining step for joining said laterally opposite end parts to each other.

6. A method for the production of a torsion beam type suspension having attached to the opposite end parts thereof wheel supporting members rotatably supporting laterally opposite wheels, wherein said torsion beam is comprised of a first and a second plate such as to form a cross section substantially of the shape of an inverted letter U perpendicular to the axis thereof and allowed to enclose a hollow part therewith by inserting the rear part of one of said two plates from the open side of the other plate inward thereby overlapping said two plates and joining the lower end of one of said plates to the butting part of the other plate by means of welding.

7. A torsion beam type suspension having spindles so fixed to end plates joined by welding to the axially opposite end parts of said torsion beam as to give rise to prescribed toe-in angle and camber angle and having wheel supporting members for rotatably supporting wheels attached to the spindles, wherein said end plates are formed of a plurality of end plates mutually joined by welding in an overlapping state and machined so that the surfaces for mounting the beam, the surfaces for mounting the spindles, and the surface for mounting the brake assume prescribed degrees of accuracy and the surfaces for mounting the beam and said torsion beam are joined by welding.

8. The torsion beam type suspension according to claim 7, wherein said end plates comprise a first and a second end plate, said first end plate has bored therein a spindle through hole for permitting insertion therethrough of the spindle, said second end plate has bored therein a through hole larger in diameter than said spindle through hole, and said first and said second end plate are joined by welding in the edge part of said spindle through hole.

9. The torsion bean type suspension according to claim 7, wherein said first end plate is provided in the inner wall part of said spindle through hole with a boss for engagement with the through hole in said second end plate.

* * * * *